US008446456B2

(12) United States Patent
Foote et al.

(10) Patent No.: US 8,446,456 B2
(45) Date of Patent: *May 21, 2013

(54) INTERSECTION DETECTION IN PANORAMIC VIDEO

(75) Inventors: Jonathan T. Foote, San Francisco, CA (US); Donald G. Kimber, Foster City, CA (US); Xinding Sun, Goleta, CA (US); John E. Adcock, Menlo Park, CA (US)

(73) Assignee: Fuji Xerox Co., Ltd., Tokyo (JP)

(*) Notice: Subject to any disclaimer, the term of this patent is extended or adjusted under 35 U.S.C. 154(b) by 1562 days.

This patent is subject to a terminal disclaimer.

(21) Appl. No.: 11/852,224

(22) Filed: Sep. 7, 2007

(65) Prior Publication Data
US 2007/0296807 A1    Dec. 27, 2007

Related U.S. Application Data

(63) Continuation of application No. 10/188,667, filed on Jul. 2, 2002.

(51) Int. Cl.
*H04N 7/00* (2011.01)

(52) U.S. Cl.
USPC .......................................................... 348/36

(58) Field of Classification Search
None
See application file for complete search history.

(56) References Cited

U.S. PATENT DOCUMENTS

| | | | |
|---|---|---|---|
| 5,262,867 A | 11/1993 | Kojima | |
| 5,646,866 A | 7/1997 | Coelho et al. | |
| 6,078,701 A | 6/2000 | Hsu et al. | |
| 6,748,316 B2 | 6/2004 | Takayama et al. | |
| 6,788,333 B1 | 9/2004 | Uyttendaele et al. | |
| 6,795,109 B2 | 9/2004 | Peleg et al. | |
| 6,816,186 B2 | 11/2004 | Luke et al. | |
| 7,096,428 B2 | 8/2006 | Foote et al. | |

OTHER PUBLICATIONS

Pajdla, Tomáš, et al., "Zero Phase Representation of Panoramic Images for Image Based Localization," Proceedings of the 8th International Conference, CAIP'99, Ljubljana, Slovenia, Sep. 1999, pp. 550-557.

Carter, G. Clifford, et al., "Estimation of the Magnitude-Squared Coherence Function Via Overlapped Fast Fourier Transform Processing," IEEE Transactions on Audio and Electroacoustics, vol. AU-21, No. 4, pp. 337-344 (Aug. 1973).

(Continued)

*Primary Examiner* — Nhon Diep
(74) *Attorney, Agent, or Firm* — Sughrue Mion, PLLC (57) ABSTRACT

Provides a system for detecting an intersection between more than one panoramic video sequence and detecting the orientation of the sequences forming the intersection. Video images and corresponding location data are received. If required, the images and location data is processed to ensure the images contain location data. An intersection between two paths is then derived from the video images by deriving a rough intersection between two images, determining a neighborhood for the two images, and dividing each image in the neighborhood into strips. An identifying value is derived from each strip to create a row of strip values which are then converted to the frequency domain. A distance measure is taken between strips in the frequency domain, and the intersection is determined from the images having the smallest distance measure between them. The orientation between the two paths may also be determined in the frequency domain by using the phases of signals representing the images in the Fourier domain or performing a circular cross correlation of two vectors representing the images.

20 Claims, 5 Drawing Sheets

OTHER PUBLICATIONS

Foote, Jonathan, et al., "FlyCam: Practical Panoramic Video and Automatic Camera Control," 2000 IEEE International Conference on Multimedia and Expo, ICME2000 Proceedings, vol. III, New York, NY, 6 pages. (2000).

Jogan, Matjaž, et al., "Panoramic Eigenimages for Spatial Localisation," CAIP '99, downloaded from http://eprints.fri.uni-lj.si/archive/00000046/01/jogancaip.pdf on Oct. 9, 2007, at http://www.webcitation.org/5SStfK6k6, 10 pages. (1999).

Jogan, Matjaž, et al., "Robust Localization Using Panoramic View-Based Recognition," ICPR 2000, v4, downloaded from http://eprints.fri.uni-lj.si/archive/00000047/01/ICPR00.pdf on Oct. 9, 2007, at http://www.webcitation.org/5SSuJrEwr, 4 pages (2000).

Kimber, Don, et al., "FlyAbout: Spatially Indexed Panoramic Video," Proc. ACM MM 2001, downloaded from http://www.fxpal.com/publications/FXPAL-PR-01-061.pdf on Oct. 9, 2007, at http://www.webcitation.org/5SSucdhOm, 9 pages. (2001).

Knapp, Charles H., et al., "The Generalized Correlation Method for Estimation of Time Delay," IEEE Transactions on Acoustics, Speech, and Signal Processing, vol. ASSP-24, No. 4, pp. 320-327 (Aug. 1976).

Manjunath, B.S., et al., "Texture Features for Browsing and Retrieval of Image Data," IEEE Transactions on Pattern Analysis and Machine Intelligence, vol. 18, No. 8, pp. 837-842 (Aug. 1996).

Pajdla, Tomáš, et al., "Zero Phase Representation of Panoramic Images for Image Based Localization," Proceedings of the $8^{th}$ International Conference, CAIP'99, Ljubljana, Slovenia, 10 pages (Sep. 1999).

Smith, John R., et al., "Integrated Spatial and Feature Image Query," ACM Multimedia Systems, 36 pages (1996).

Stein, Fridtjof, et al., "Map-Based Localization Using the Panoramic Horizon," IEEE Transactions on Robotics and Automation, vol. 11, No. 6, pp. 892-896 (Dec. 1995).

Swain, Michael J., et al., "Color Indexing," International Journal of Computer Vision, vol. 7, No. 1, pp. 11-32 (1991).

Tribolet, José M., "A New Phase Unwrapping Algorithm," IEEE Transactions on Acoustics, Speech, and Signal Processing, vol. ASSP-25, No. 2, pp. 170-177 (Apr. 1977).

INTERSECTION DETECTION IN PANORAMIC VIDEO

CLAIM OF PRIORITY

This application claims priority to U.S. patent application Ser. No. 10/188,667, entitled "INTERSECTION DETECTION IN PANORAMIC VIDEO," by inventors Jonathan T. Foote et al., filed Jul. 2, 2002, the entire contents of which are incorporated herein by reference.

CROSS REFERENCE TO RELATED APPLICATIONS

The following commonly owned, United States patent is related to the present Application and is incorporated by reference herein in its entirety.

U.S. Pat. No. 7,096,428, entitled "SYSTEMS AND METHODS FOR PROVIDING A SPATIALLY INDEXED PANORAMIC VIDEO," by inventors Jonathan T. Foote and Donald G. Kimber, issued Aug. 22, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to video image processing, and more particularly to detecting intersection information in video sequences.

BACKGROUND OF THE INVENTION

Video applications have expanded in recent years for use with camcorders, televisions, and computers. As a result, use of panoramic video has expanded as well. One common use of panoramic video is to represent travel along a path. The path may be a street, a building corridor, or some path in abstract space.

Representation of travel along a one way path is straightforward. A video sequence displaying travel along the path is provided to a user, thereby allowing a user to "proceed" down the path. A more difficult problem arises relates to intersections as displayed in video. The problem arises in finding an efficient basis in which to allow a user who is proceeding down a path to view travel through different paths of an intersection as displayed in video. Capturing video in every combination of possible paths available at an intersection is impractical due to data storage, data processing, and the time and resources required to capture the video. Another possible solution is to provide a single video sequence along each direction of an intersection (thus, two video sequences for an intersection of two streets). When a change in direction is required at an intersection, the video sequence displayed for a user may change from the video sequence in which the entry to the intersection is displayed to the video sequence displaying the desired exit path from the intersection. Several problems arise with this method of providing video at an intersection.

The problem may be broken into two parts. The first part is detecting when an intersection in the panoramic video appears. An intersection is an image of an identical location that occurs at different times and from different directions in the video. For example, an intersection of two streets, one oriented north-south and one oriented east-west, may be captured in panoramic video from an east-west direction as well as a north-south direction. A panoramic video sequence traveling through the intersection along each direction will capture the same location at different times and from different directions.

One method for detecting an intersection is to go through all the video frames of a sequence and label the intersections manually. From a practical point of view, this process would become extremely tedious and time consuming for large scale applications, such as labeling the intersections on a city street map. Selecting the intersections by hand would also be less accurate then automatic methods, as this method would rely on the human eye for choosing between images that may have been taken only 1/30th of a second apart for video frames displayed at 30 Hz. Further, adding additional information to the video frames to be analyzed by a processor would require more processing power.

The second part of the problem is to determine how to provide a smooth transition between the separate panoramic video sequences. A smooth transition is desirable to make the change from one video sequence to another video sequence appear as a single video sequence. One solution would be to label each video sequence with orientation data at the corresponding intersection frames to indicate the angle the video sequence is captured relative to the intersection. As with adding intersection data, the addition of intersection orientation data would become extremely tedious and time consuming for large scale applications, such as labeling the intersections on a city street map. Further, adding additional information to the video frames to be analyzed by a processor would require more processing power.

What is needed is a system for detecting the intersection of an intersection between two separate panoramic video sequences captured while traveling through the intersection from different directions. The system should determine where the intersection is and the orientation of the images depicting the intersection.

SUMMARY OF THE INVENTION

In one embodiment, the present invention provides a system for detecting an intersection in more than one panoramic video sequence. Video images and corresponding location data are received. The images and location data may be processed to ensure all the images contain location data. An intersection between two paths is derived from the video images. The orientation between the two paths may also be determined from the video images.

In one embodiment, detecting an intersection between two paths includes deriving a rough intersection between two images using location data associated with each frame image. A neighborhood is then determined for the two images. Next, each image in the neighborhood is divided into strips. An identifying vector is derived from each strip to create a row of strip values. The strip values are converted to the frequency domain, a distance measure is taken between strips in the frequency domain, and the intersection is determined from the images having the smallest distance measure between them.

In one embodiment, detecting the relative orientation of two panoramic images includes using the phases of signals representing the images in the Fourier domain. The slope of the phase difference between the Fourier representation of the two images may be considered to be relative orientation of the two candidate images. In another embodiment, detecting the relative orientation of two panoramic images includes performing a circular cross correlation of two vectors representing the images.

DETAILED DESCRIPTION

In one embodiment, the present invention provides a system for detecting an intersection in more than one panoramic video sequence where the panoramic sequences capture the intersection. Video images and corresponding location data are received. The images and location data may be processed to ensure all the images contain location data. An intersection between two paths is derived from the video images. In one embodiment, the intersection is determined to include a frame from each panoramic video frame sequence, where the frames depict the most similar image of the intersection. The relative orientation between the two paths may also be determined from the video images. In one embodiment, performing the intersection detection and orientation detection include processing image information in the frequency domain. Among the areas invention may be applicable include panoramic based virtual reality systems as well as any application displaying video images where a common point or image displayed in at least two video sequences is to be recognized or processed.

The present invention may be used to detect an intersection in two or more panoramic video sequences where an intersection is captured or displayed from a similar vertical position and spatial position but from any angle. A panoramic camera may provide a cylindrical panoramic image that repeats periodically every 360 degrees. Two panoramic images taken at the same spatial location with the same cylindrical axis differ in relative orientation. In this disclosure, camera rotation corresponds to the column direction, and height corresponds to row direction of panoramic images.

Figure 1:
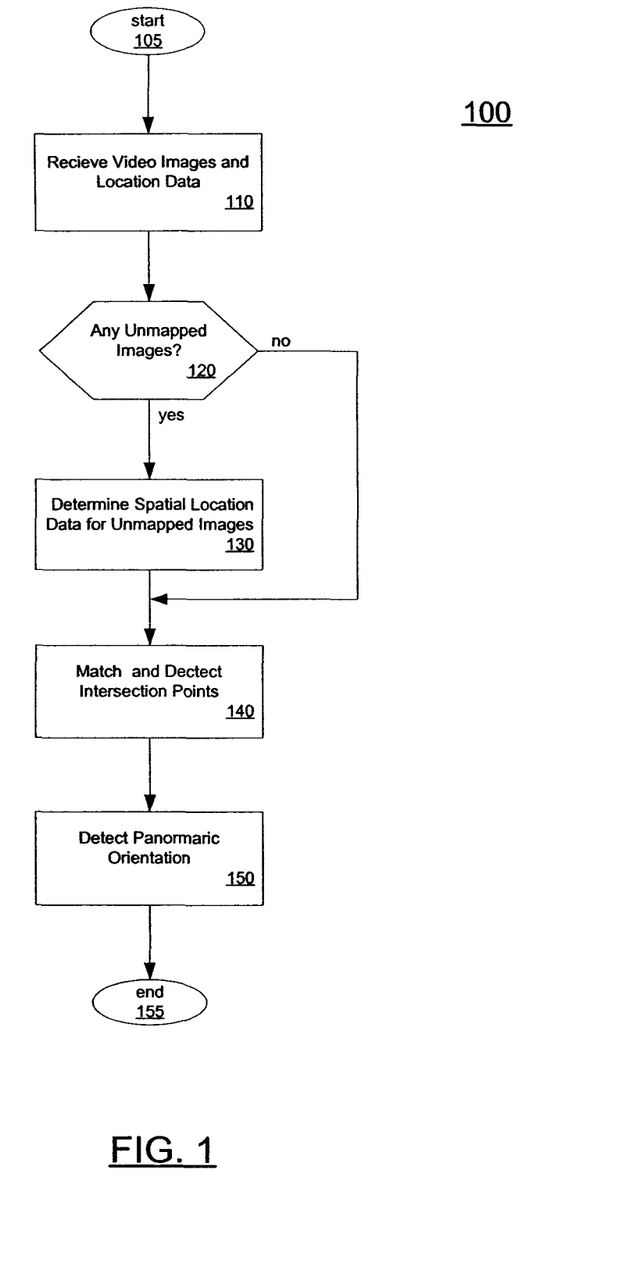
FIG. 1 is an illustration of a method for matching images from video sequences captured at an intersection in accordance with one embodiment of the present invention.

A method 100 for matching images from video sequences captured at an intersection in accordance with one embodiment of the present invention is illustrated in FIG. 1. Method 100 begins with start step 105. Next, video images and location data are received in step 110. In one embodiment, the video images are a sequence of panoramic video frames captured from a path that contains the intersection to be displayed. Each panoramic video sequence may contain a plurality of images of the intersection. A path as used herein is defined as an area in space that may be depicted visually and traversed or traveled in some manner by a user. The space may be abstract or real. An intersection as used herein is defined as a common point between more than one path. In one embodiment, the user may traverse each path. Video frame sequences received in step 110 may represent each path capable of being traveled at the intersection. In one embodiment, separate video frame sequences are not needed for each traversable direction of a path. For example, a single panoramic video frame sequence captured along a two-way street may be played back forward or backward to represent traveling in either direction along the street. In one embodiment, the panoramic video frame sequences received may be in the format as captured using a FlyAbout panoramic video camera system as disclosed in U.S. patent application No. 60/325,172, incorporated herein by reference.

Figure 2:
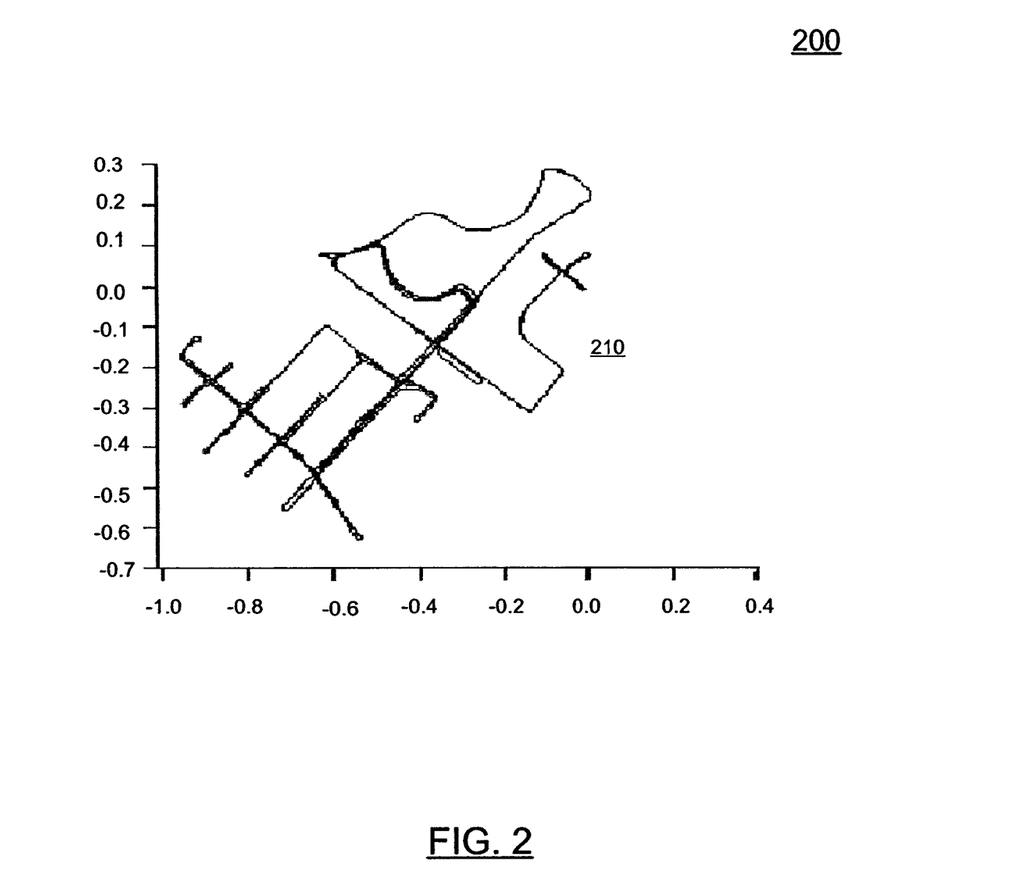
FIG. 2 is an illustration of geographical data recorded in graphical format in accordance with one embodiment of the present invention.

In addition to video image sequences, spatial location data is received in step 110. The spatial location data allows a spatial location to be associated with video images. In one embodiment of the present invention, spatial location data may consist of data representing a geographic location associated with a video image. Spatial location data may be associated with every image or less than every image. In one embodiment, the spatial location data may consist of satellite-based geographical positioning system such as Global Positioning System (GPS) data. GPS data 200 collected while capturing video images in a city neighborhood may appear as shown in FIG. 2. In FIG. 2, the horizontal axis corresponds to longitude and the vertical axis corresponds to latitude. The GPS data 210 captured may roughly indicate city streets or other points in space. In one embodiment, GPS data provided at 1 Hz and stamped to video frames occurring at a 30 Hz frame rate provide for video frames location stamped with GPS data once every thirty video frames. In addition to GPS, other types of location data can be used to associate a video image with a spatial location. These methods include but are not limited to inertial navigation, radio beacon, and landmark triangulation.

Once the video images and spatial location data are received in step 110, the location of any frames not associated with spatial location data is determined in step 120. In one embodiment, where some panoramic image frames are stamped with spatial location data and some are not, the spatial location of the non-stamped frames may be estimated by linear or other interpolation. For example, if frames in a video sequence occur at a 30 Hz frame rate and the frames are stamped with spatial location data that is provided at 1 Hz, a frame occurring ten frames past the last location stamped frame is assumed to be one third the distance between the last location stamped frame and the next location stamped frame by linear interpolation. The frame may be stamped with location data corresponding to a distance one third along the path between the time stamped frames and represented by the video sequence containing the frame. In one embodiment, location information is determined only for images deemed near an intersection. Other interpolation methods using speed or acceleration as well as distance may be used to associate location data with a frame. In addition to interpolation, other value estimation methods can be used to determine the location of frames not associated with spatial location data.

After additional spatial location data is determined in step 120, operation continues to step 130 where intersection points of the panoramic video image sequences are determined. The intersection points of the panoramic video sequences are determined using the images themselves. In one embodiment, the intersection points of the panoramic video frame sequences is are determined by detecting the frames having the most similar images of the intersection in the two sequences. The step of intersection detection is discussed in more detail with reference to FIG. 3. Once the intersection points are determined between two video sequences, the panoramic orientation is detected in step 140. Orientation detection is discussed in more detail below. After the orientation of the two panoramic video sequences is detected, the process ends instep 150.

Figure 3:
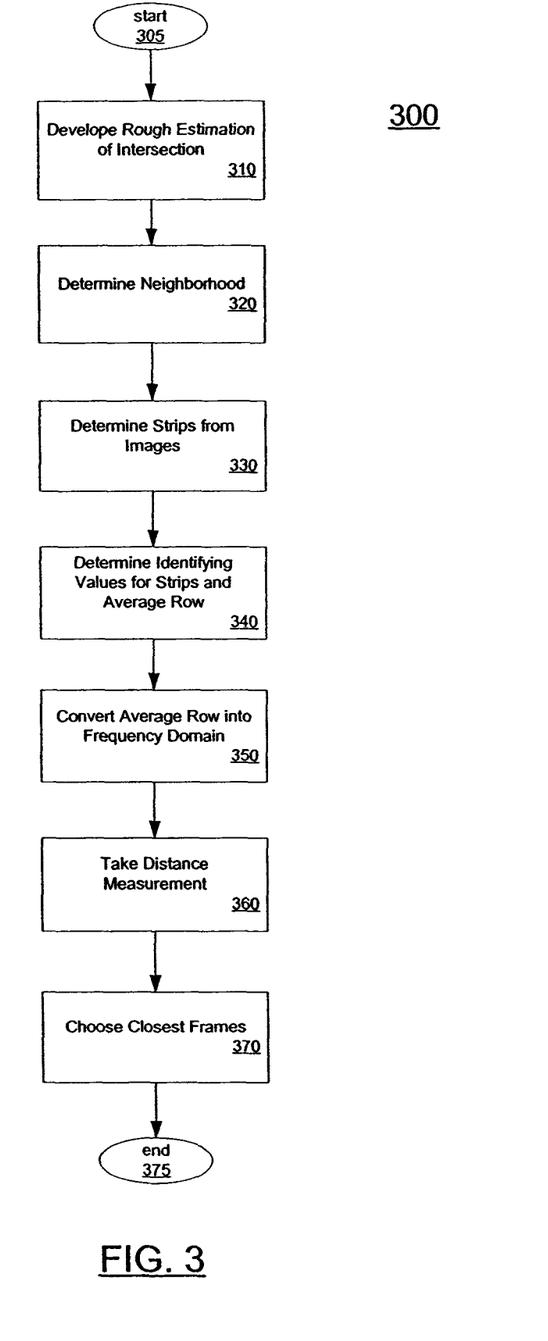
FIG. 3 is an illustration of a method for detecting intersection points in video sequences in accordance with one embodiment of the present invention.

FIG. 3 displays a method 300 for detecting the intersection between two panoramic video sequences in accordance with one embodiment of the present invention. Method 400 begins with start step 305. Next, a rough estimate of the intersection of at least two paths is determined in step 310. In one embodiment, the location data of frames associated with each path are compared to determine which frames are closest to each other. These two frames form the rough estimate of the intersection. A neighborhood having neighborhood frames that comprise possible intersections is then determined in step 320. In one embodiment, all frames within a certain parameter value of the rough estimate of the intersection are selected as part of the neighborhood. Examples of the parameter value include a time period or spatial location, such that neighborhood frames occur within a time period of the frames comprising the rough estimate of the intersection or have location data indicating the frame is associated with a location existing within a specified distance from the location associated with the rough estimate of the intersection. For example, a neighborhood may be comprised of all frames captured within two seconds of either of the frames that make up the detected rough intersection. The size of a neighborhood is arbitrary. However, the neighborhood should be chosen to include a number of frames likely to include the actual intersection while still be small enough to be manageable by processing resources.

Figure 4:
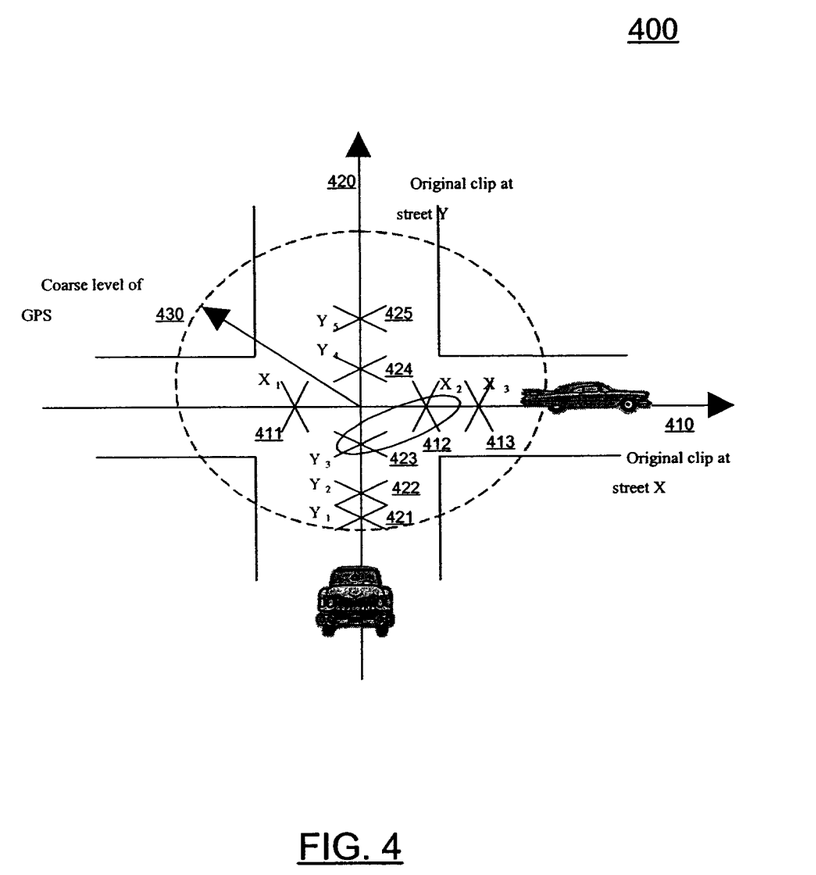
FIG. 4 is an illustration of a path intersection with geographical data points in accordance with one embodiment of the present invention.

FIG. 4 illustrates a path intersection neighborhood 400 in accordance with one embodiment of the present invention. Path intersection 400 includes a first path 410 along a x direction, a second path 420 along a y direction, first path location data points 411, 412, and 413 labeled $x_1$, $x_2$, and $x_3$, respectively, second path location data points 421, 422, 423, 424, and 425 labeled $y_1$, $y_2$, $y_3$, $y_4$, and $y_5$, respectively, and a neighborhood border 430. In the example illustrated in FIG. 4, a rough intersection was determined to exist at points $x_2$ and $y_3$. The neighborhood of the intersection was then determined to be all frames encompassed by the dotted line 430.

In the case where the intersection of two paths is being determined, the data points from the two sets of candidate panoramic images may be expressed as:

$$X = \{X_1, X_2, X_3, \ldots X_M\}$$

$$Y = \{Y_1, Y_2, Y_3, \ldots Y_N\},$$

where M and N are the number of images in sets X and Y, respectively. The two closest frame images may be determined according to:

$$(i^*, j^*) = \operatorname{argmin}(\text{Distance}(X_i, Y_j)), \quad (1)$$

$$(1 \leq i \leq M, 1 \leq j \leq N)$$

where i and j are the frame indexes, and $X_i^*$ and $Y_j^*$ are taken as the intersection of the two paths.

In one embodiment of the present invention, the distance between two panoramic frames may be calculated using a Fourier transform. A Fourier transform works well for matching purposes because the magnitude of the Fourier transform is invariant to phase. In one embodiment, to apply a Fourier transform, each image may be divided into rows. A set of values may then be derived from each row. In one embodiment, a Fourier transform could be taken on a specified row of pixel values of each panoramic image. The resultant Fourier spectra derived from different frames within the neighborhood could then be compared to determine the closest images. However, practical limitations may prohibit direct application of such spectra matching. Limitations such as different axis of projection of a camera and camera position displacement can cause changes in a panoramic image and the rows within the images.

In another embodiment of the present invention, a Fourier transform is taken on only a portion of the panoramic image. In this embodiment, a panoramic image having H rows and W columns of pixels is segmented into R strips and C columns, wherein R is less than H and C is less than W. Thus, each strip is comprised of a number of pixel rows equaling H/R and a number of pixel columns equaling W/C. The number of strips R and columns C an image should be segmented into depends upon several factors, including the detail within the image, the original image resolution, effects such as lighting variation and camera displacement. In one embodiment, one or more strips may overlap each other. This step is illustrated as step 330 in FIG. 300.

After the strips are configured for a neighborhood of images, an identifying value is assigned to each strip as shown in step 340. The identifying value should be similar in strips that depict similar visual images, such as an intersection between two paths. In one embodiment, the identifying value is the average of the image intensity for each strip at each column position. In addition to representing a group of pixels, the averaging of the panoramic image strips smooths the row images. The average image intensity may be determined in several ways. For black and white images, the average intensity value may be determined by averaging values for all pixels in the strip at the particular column. For color images, the average intensity value may be derived by averaging the value derived from each RGB component of the pixels in a strip. For example, the values of the red, green, and blue components of a pixel could be added together or weighted in some manner to determine the pixel value. The pixel values are averaged for each strip at each column position, thereby forming a row of average pixel values for each strip. Thus, for a panoramic image strip matrix where $P = \{P_{i,j}\}$, $1 < i < H/R$, $1 < j < C$, the corresponding average row is $R_{AV} = (P_1, P_2, \ldots P_j, P_C)$, where:

$$P_j = \sum_{i=1}^{\frac{H}{R}} P_{i,j} \quad (2)$$

Figure 5:
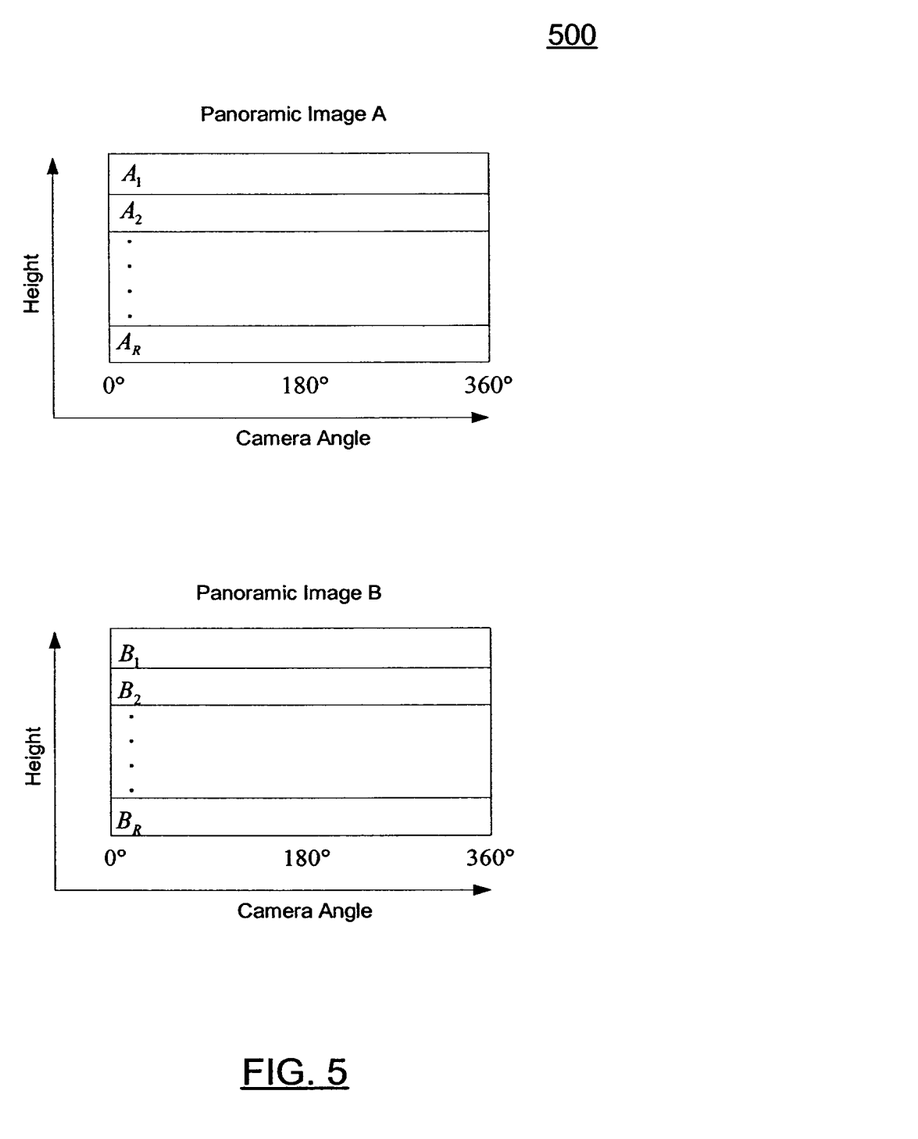
FIG. 5 is an illustration of panoramic images with strip segmentation in accordance with one embodiment of the present invention.

In FIG. 5, $A_1$ through $A_R$ and $B_1$ through $B_R$ represent the average rows for panoramic image A and B, respectively, in accordance with one embodiment of the present invention.

Once the strips and average rows are determined from the average pixel values, the average row values are converted to the frequency domain as illustrated in step 350. The conversion to the frequency domain may be performed by hardware or software performing the steps of the present invention or performed and communicated to the system of the present invention by an outside source. In one embodiment of the present invention, a discrete Fourier transform (DFT) is performed on each of the averaged rows to derive a Fourier spectra data. The Fourier spectra may consist of the Fourier magnitudes, the Fourier phase difference, or both. In one embodiment, the magnitude of the DFT is taken as a one dimensional texture of the strip. In one embodiment, the DFT of the averaged row is computed using the Fast Fourier Transform (FFT). Thus, a one dimensional texture coefficient vector $S_A$ can be computed as:

$$S_A = |FFT(A)|.$$

A two dimensional texture could be used instead of a one dimensional texture if the panoramic images had a spatial constraint in the row direction.

After the FFT is taken of the average row values and/or the Fourier spectra data associated with the strips in a row is received, the distance between two panoramic images is computed in step 360. In one embodiment, assuming the strips $A_j$ from an image A and $B_j$ from an image B have one dimensional texture vectors of $S_{Ai}$ and $S_{Bj}$, respectively, then a distance measure may be defined as:

$$\text{Distance}(A_i, B_j) = \frac{\|S_{Ai} - S_{Bj}\|_M}{\text{Max}(\|S_{Ai}\|_M, \|S_{Aj}\|_M)} \quad (3)$$

where $\|S_{Ai} - S_{Bj}\|_M$ is the Euclidean distance between the middle band of $S_{Ai}$ and $S_{Bj}$, and $\|S_{Ai}\|_M$ and $\|S_{Bj}\|_M$ are the amplitudes of vectors $S_{Ai}$ and $S_{Bj}$ in the middle band. The $\text{Max}(\|S_{Ai}\|_M, \|S_{Bj}\|_M)$ term is used to normalize the distance measure between the two vectors. This normalizing feature is helpful in preventing the distance measure from becoming biased towards pairs with higher mid-frequency energy when several pairs of average rows are compared. Other normalizations could be used, including the average values or the variances. In equation (3), the middle band frequencies derived from the average rows of panoramic images are compared. Images captured of a similar location will have similar middle frequencies and a corresponding low distance value in Equation (3). Other distance measures such as cosine and inner product may also be used and are considered within the scope of the present invention.

In the embodiment of the invention discussed above, the texture coefficients are truncated to middle frequencies. There are several advantages to this method. Low frequency and DC components of an image spectrum are often very sensitive to changes in illumination. Thus, to minimize the effect of different lighting on the same location in two different images, the low frequency components may be eliminated. Removing the high frequency spectra helps to reduce the noise and reduce the effect of different objects at the same location (such as a car present at the intersection in one image but not another).

The distance measure between two panoramic images can then be computed as the sum of the distances between the one dimensional texture vectors for two images at corresponding row positions:

$$\text{Distance}(A, B) = \sum_{i=1}^{\frac{H}{R}} \text{Distance}(A_i, B_i) \quad (4)$$

Based on the distance measure of equation (4), equation (1) can be used to detect the closest frames from two paths that comprise an intersection. This step is illustrated as step 370. Other distance measures and averaging methods can be used with the present invention, including a median filter in the case of outliers rather than the average of equation (4). These other distance measures and averaging methods are considered within the scope of the present invention. Once the two closest frames that form the intersection are determined, method 300 ends at step 375.

In one embodiment, once the two closest frames are detected, the panoramic orientation of each image may be determined. The panoramic orientation may be used to determine the relative angle between the paths and the amount that one image may need to be rotated to match another image. One method of determining a rough estimate of the orientation of each path is by taking the derivative of the spatial location data of the frames. This derivative will give a spatial direction for each path. However, more precise methods can be used that examine the panoramic image data rather than the location data.

One method using panoramic image data uses the phase of the signals once the averaged rows are converted to the Fourier domain. As discussed above, two panoramic images are divided into strips of rows and columns. An identifying numerical value is taken from each strip, such as the intensity of the pixels within the strip. Thus, a first image A may be represented by a signal a[n] with a period of W, wherein the strip has a width of W. Similarly, a second image B may be represented by a signal b[n] with a period W, wherein the strip has the same width W. The strips from A and B are taken at similar locations in the panoramic image but with the camera rotated an amount θ radians about a cylindrical axis, so that b[n]=a[(n−d)modW]. Here, d=Wθ/2π. Next, a DFT is performed on each strip. The Fourier spectra A[k] and B[k] of a[n] and b[n], respectively, will be related by B[k]=A[k]exp(−jdk2π/W). The phase difference between A[k] and B[k] can be written as:

$$D[k]=\text{Arg}(A[k])-\text{Arg}(B[k])=dk2\pi/W=\theta k,$$

where Arg(A[k]) and Arg(B[k]) denote the radian phase of the complex value of A[k] and B[k], respectively. The phase difference between A[k] and B[k] is linear in k and has a value of zero at k=0. The slope of the linear relationship is k. Thus, the angle of rotation of the between the two panoramic images may be determined directly from the slope of the phase difference D[k]/k, or from the unweighted least squared error linear fit to the set of phase differences:

$$\theta = \frac{\sum_{k=0}^{W-1} kD[k]}{\sum_{k=0}^{W-1} k^2} \quad (5)$$

or the best unbiased linear estimator given by:

$$\theta = \frac{\sum_{k=0}^{W-1} \text{var}(D[k])^{-1} kD[k]}{\sum_{k=0}^{W-1} \text{var}(D[k])^{-1} k^2} \quad (6)$$

where var(D[k]) denotes the variance of the phase difference estimate at frequency bin k. The linear fit of a data series can generally be performed in the closed-loop fashion of equation (5). However, phase unwrapping may be helpful in this embodiment because the phase difference is ambiguous in that it is only known mod2π. The appropriate multiple of 2π by which to unwrap the phase difference at a given frequency k is dependent upon the current estimate of the slope θ. Thus, in one embodiment of the present invention, the best slope θ that minimizes the error function in equation (5) is searched for explicitly by unwrapping the phase difference appropriately for each candidate value of θ, estimating the squared error of the linear fit for that hypothesized value, and then choosing the value of θ that yields the smallest error. This can be represented by:

$$\theta = \arg_\theta \min \sum_{k=0}^{W-1} G[k]|\theta k - \text{unwrap}(D[k], \theta)|^2 \quad (7)$$

The function unwrap (D[k],θ) adds the appropriate integer multiple of 2π to each value of D[k] to minimize the excursion from the linear estimate based on the current value of θ. G[k] is an arbitrary weighting function that may be used to emphasize the contribution of some frequencies over others. For example, frequencies with noise may be de-emphasized with low pass weighting or a weighting that is derived from the image data itself that provides noise level information at each frequency component (such as weighting each frequency by the power at that frequency).

In another embodiment of the present invention, the iterative search method of equation (7) is avoided by performing the linear fit to D[k] incrementally starting from the lowest frequency bin and an initial slope value estimate of zero. At the next highest frequency bin, the phase difference is unwrapped based upon the current estimate of θ. The estimate of the slope is then updated with the newly unwrapped value. The rotation is estimated in this manner for each strip of the image. The mean or median of the estimated rotations is used to determine the final estimate of the image rotation. In yet another embodiment, the error in equation (7) may be minimized over all the image strips simultaneously by summing the phase fit error for each strip and finding the rotation that minimizes the sum of the phase fit errors according to:

$$\theta = \arg_\theta \min \sum_j \sum_{k=0}^{W-1} G_j[k]|\theta k - \text{unwrap}(D_j[k], \theta|^2 \quad (8)$$

where $D_j[k]$ is the phase difference for strip j, $G_j[k]$ is the weighting function for strip j, and the outer sum is taken over all available strips.

In another embodiment of the present invention, the phase difference θ may be determined by finding the shift d that corresponds to the maximum of the circular cross correlation c[s] of a[n] and b[n], where:

$$c[s] = \frac{1}{W} \sum_{n=0}^{W-1} a[n]b[n-s] \quad (9)$$

Accordingly, C[k]=DFT {c[s]} satisfies C[k]=A[k]B*[k], where * indicates complex conjugation is to be performed, and c[s] may be computed by taking the inverse DFT of C[k]. The value of s for which c[s] is maximized is taken as the estimate of the rotation d. In one embodiment, the computation for d is performed for each band of the corresponding panoramic images. The mean or median value of the d values is used for the overall estimate of rotation between the panoramic images.

In another embodiment of the present invention, the accuracy of the correlation process may be improved by implementing a weighting function into the cross correlation. Weighting the cross correlation in the frequency domain with an arbitrary function G[k] may increase or decrease the contribution of certain frequencies as desired (such as decreasing the contribution of a frequency having high noise). With a weighting function, the generalized cross correlation can be expressed as:

$$c[s]=IDFT\{G[k]A[k]B*[k]\} \quad (10)$$

The weighting function may be derived from a-priori knowledge or dynamically from the statistics of the two images being aligned. An example of an a-priori knowledge-based weighting function may include using a low pass filter to filter out high frequencies known to have more noise then low frequencies. An example of a dynamic weighting function may make G[k] equal to the reciprocal of an estimate of the variance or noise at each frequency. Yet another example of a weighting function could implement G[k] as the magnitude-squared coherence function estimated from the image data at each frequency, expressed as:

$$G[k] = \text{Cohere}[k] = \frac{|A[k]B*[k]|^2}{|A[k]|^2|B[k]|^2} \quad (11)$$

In one embodiment, the present invention may be used to generate composite panoramic video frame sequences about an intersection. In this embodiment, orientation and intersection information derived from the images themselves as discussed above may be used to combine two intersecting video frame sequences. For purposes of the example discussed herein, in an intersection having a north-south direction and an east-west direction, it shall be assumed that a first panoramic video sequence contains frames captured while traveling through the intersection in the north-south direction and contains a first intersection frame. It shall also be assumed that a second panoramic sequence having frames captured while traveling through the intersection in the east-west direction contains a second intersection frame, where the first and second intersection frames are determined to be the two frames with the most similar image between the sequences and thereby associated with the intersection of the sequences. When the two intersection frames are known, a composite frame sequence may be generated that contains frames from different video frame sequences with a common intersection. In one embodiment, the composite video sequence may include frames from the first panoramic video frame sequence up until the intersection frame from the first sequence. Once the intersection frame from the first video sequence is reached, the next frame in the composite panoramic video frame sequence may be the intersection frame from the second video sequence. The frames in the composite video sequence may then consist of frames located after the intersection frame of the second video sequence. Thus, the composite video sequence may consist of two frame sequences, wherein the first sequence is taken from the first panoramic video frame sequence and consists of consecutive frames in the first sequence up until the first intersection frame, and the second sequence is taken from the second panoramic video frame sequence and consists of consecutive frames starting from the second intersection frame. Using the detection information derived using the images themselves as discussed above, a composite panoramic video sequence can be created with frames depicting travel through the intersection in any direction as indicated by a user.

In another embodiment, the transition between the two intersection frames in a composite panoramic video frame sequence may be smoothed out by utilizing relative orientation information associated with the video frame sequences. Instead of providing a transition between two intersection frames where the view of the image is suddenly shifted by the amount of the relative orientation between them, the transition may be smoothed out by rotating the view in the images. The smoothing effect may be derived by using the orientation information to provide a "turning" effect from one frame sequence to the other.

Once the orientations of the video frame sequences have been aligned, the two video streams can by slowly cross faded to reduce the artifacts of an abrupt transition at the intersection. This may require the relative orientation to be detected for a time window before and after the intersection so that the cross-fading is done between matching sequences such as the matching panoramas.

In one embodiment, though both video frame sequences include captured image data representing a panoramic image, the actual image displayed to a user may be less than the entire panoramic data. Thus, instead of providing a 360 degree view of an image of a street to a user as the frames are shown, the image presented to a user may only provide a 90 degree view facing in the direction the consecutive frames were captured (ie, from north to south or from east to west).

In this embodiment, a first and second panoramic video frame sequence may display a reduced view of the middle one fourth of the frame image. In another embodiment of the present invention, the reduced view may include video that is not taken from panoramic video. The reduced view could be taken from 4:3 aspect ratio video of some other format of video. For purposes of example only, the following discussion will assume the first and second video sequence have a panoramic format. When the first panoramic video frame sequence displaying the reduced view reaches a first intersection frame, the displayed view of the first intersection frame may by adjusted or rotated to until the view of first intersection frame is similar to the displayed view (the middle one fourth of the frame image) of the second intersection frame in the second panoramic video frame sequence. In order to provide a smooth rotation over time, the composite video frame sequence may include multiple frames of the first intersection frame, wherein a different view within the first or second intersection frame is provided in each frame, in order to provide for a shift in the view of the frame. The amount of the view rotation would correspond to the relative orientation that was derived from the frame image data as discussed above. Alternatively, both views of the intersection frames could be rotated towards each other to meet at a point of view somewhere in the middle of the relative orientation between them.

In another embodiment of the present invention for generating a composite panoramic video frame sequence from two intersecting panoramic video frame sequences, frames from a first panoramic video frame sequence are displayed. As the displayed frames in the first sequence approach the first intersection frame, the view of the currently displayed frame may be shifted in a direction towards the relative orientation between the intersection frames. The intersection frames from each panoramic video frame sequence are then adjusted in view slightly to compensate for a portion of their relative orientation, followed by adjusting the views of several frames immediately after the second intersection frame in the second panoramic video frame sequence until the orientation between the sequences is completely compensated for. Thus, instead of adjusting the view from only the intersection frames to compensate for the relative orientation, the relative orientation is gradually compensated for by adjusting the views of several frames located closest to the intersection frames as well as the intersection frames themselves. This provides for a video frame sequence having a smoother, more gradual change in view. This embodiment provides a view having more detail in the direction the user with will eventually be heading, the direction ultimately captured by the second sequence of frames, as the user approaches the turn that will lead in that direction. This type of gradual view change is similar to that of someone driving a car who glances in the direction of where she or he will be turning before actually making the turn. The amount of the view change or compensation may be determined mathematically or manually such that the generated composite video frame sequence provides a smooth transition between the frame sequences. Further, image averaging and smoothing techniques may be used to compensate for any discrepancies between the images of the two intersection frames.

In one embodiment, the present invention provides a system for detecting an intersection in more than one video sequence. Video images and location data are received. The images and location data may be processed to ensure all the images contain location data. An intersection between two paths is derived from the video images. The orientation between the two paths may also be determined from the video images. In one embodiment, performing the intersection detection and orientation detection include processing image information in the frequency domain. In one embodiment, the images are panoramic video images.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing at least one of additive model representation and reconstruction.

Included in the programming (software) of the general/specialized computer or microprocessor are software modules for implementing the teachings of the present invention, including, but not limited to, separating planes of a source image, averaging at least one of foreground and background colors, replacing colors, and compensating for error introduced by color replacement in one plane by feeding error into a second plane, storage, communication of results, and reconstructing an image according to the processes of the present invention.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A method for detecting an intersection as displayed in two intersecting panoramic image sequences, the method comprising:
   receiving data representing two intersecting panoramic image sequences of an identical location captured at different times and from different directions, wherein the two intersecting panoramic image sequences each include a plurality of video frames depicting an image of the intersection between the intersecting panoramic image sequences;
   detecting, using one or more microprocessors, frame images that are most similar from each of the intersecting panoramic image sequences using only the data representing the two intersecting panoramic image sequences, wherein detecting the most similar frame images includes
      segmenting each of the plurality of frames into at least one strip, wherein the plurality of frames are divided into rows and at least one strip is associated with each row,
      determining an identifying value for each strip,
      determining, based on the identifying value for each strip, a distance measurement between strips in corresponding rows in each of the plurality of frames to determine which of the plurality of frames from the two intersecting panoramic image sequences are closest to each other; and
   detecting, based on the frame images that are most similar, an intersection frame from each of the intersecting panoramic image sequences, wherein the intersection frame includes the frame images that are most similar from each of the intersecting panoramic image sequence.

2. The method of claim 1 wherein the identifying value is an average intensity of the pixel values for pixels contained in the at least one strip.

3. The method of claim 1 wherein determining the distance measurement further includes:
   receiving Fourier spectra data associated with the at least one strip in a corresponding row of each of the plurality of frames; and
   comparing the Fourier spectra data to derive a distance measurement between each of the plurality of frames of each intersecting panoramic image sequence.

4. The method of claim 3 further including:
   determining the intersection frames to be associated with the frame images having a shortest distance measurement between them.

5. The method of claim 3 wherein the distance measurement is one of a Euclidean, cosine, and normalized distance.

6. The method of claim 5 wherein the distance measurement is weighted to create a weighted distance measure.

7. The method of claim 6 wherein the weighted distance measurement includes one or more weights to reduce a high and a low band of the Fourier spectra.

8. A method for detecting an intersection as displayed in two intersecting panoramic image sequences, the method comprising:
   receiving a first set of data representing two panoramic image sequences, wherein the two panoramic image sequences each include a plurality of frames depicting an image of an intersection, the first set of data including pixel data and location data, and wherein the location data is associated with at least one frame from each sequence;
   determining missing location data for any of the plurality of frames not associated with the location data;
   detecting, using one or more microprocessors, the intersection using only the first set of data representing the two intersecting panoramic image sequences, wherein detecting the intersection includes
      determining a rough intersection between the two intersecting panoramic image sequences by comparing the location data for each of the plurality of frames,
      determining a neighborhood having a set of neighborhood frames, wherein the neighborhood includes the rough intersection, the set of neighborhood frames, and frames from the plurality of frames that are located within a parameter relative to the rough intersection, and
      determining, based on the neighborhood, a most similar frame from each of the intersecting panoramic image sequences, wherein the most similar frame is used to detect the intersection.

9. The method of claim 8 wherein determining a most similar frame includes:
   deriving strips from the two panoramic image sequences;
   determining an identifying value for each strip; and
   processing the identifying values to determine a distance measurement between the two panoramic image sequences.

10. The method of claim 8 wherein the parameter is a minimum distance from the rough intersection frames.

11. The method of claim 8 wherein the parameter is a minimum time from the rough intersection.

12. The method of claim 8 wherein determining missing location data includes performing interpolation using location data associated with a frame.

13. The method of claim 8 wherein the location data is one of a satellite-based geographical positioning system data, an inertial navigation data, a radio beacon data, and a landmark triangulation data.

14. A non-transitory computer readable storage medium storing one or more sequences of instructions for detecting an intersection as displayed in two intersecting panoramic image sequences, wherein said instructions, when executed by one or more processors, cause the one or more processors to execute the steps of:

receiving data representing two intersecting panoramic image sequences of an identical location captured at different times and from different directions, wherein the two intersecting panoramic image sequences each include a plurality of video frames depicting an image of the intersection between the intersecting panoramic image sequences;

detecting frame images that are most similar from each of the intersecting panoramic image sequences using only the data representing the two intersecting panoramic image sequences, wherein detecting the most similar frame images includes segmenting each of the plurality of frames into at least one strip, wherein the plurality of frames are divided into rows and at least one strip is associated with each row, determining an identifying value for each strip, determining, based on the identifying value for each strip, a distance measurement between strips in corresponding rows in each of the plurality of frames to determine which of the plurality of frames from the two intersecting panoramic image sequences are closest to each other; and detecting, based on the frame images that are most similar, an intersection frame from each of the intersecting panoramic image sequences, wherein the intersection frame includes the frame images that are most similar from each of the intersecting panoramic image sequence.

15. The non-transitory computer readable storage medium of claim 14 wherein the identifying value is an average intensity of the pixel values for pixels contained in the at least one strip.

16. The non-transitory computer readable storage medium of claim 14 wherein determining the distance measurement further includes:

receiving Fourier spectra data associated with the at least one strip in a corresponding row of each of the plurality of frames; and comparing the Fourier spectra data to derive a distance measurement between each of the plurality of frames of each intersecting panoramic image sequence.

17. The non-transitory computer readable storage medium of claim 14 further including:

determining the intersection frames to be associated with the frame images having a shortest distance measurement between them.

18. The non-transitory computer readable storage medium of claim 14 wherein the distance measurement is one of a Euclidean, cosine, and normalized distance.

19. The non-transitory computer readable storage medium of claim 14 wherein the distance measurement is weighted to create a weighted distance measure.

20. The non-transitory computer readable storage medium of claim 19 wherein the weighted distance measurement includes one or more weights to reduce a high and a low band of the Fourier spectra.

* * * * *